United States Patent
Taniguchi et al.

(10) Patent No.: US 7,487,450 B2
(45) Date of Patent: Feb. 3, 2009

(54) COMPUTER DISPLAY SYSTEM, COMPUTER APPARATUS AND DISPLAY APPARATUS

(75) Inventors: Kenshi Taniguchi, Katano (JP); Masatoshi Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 570 days.

(21) Appl. No.: 10/499,115

(22) PCT Filed: Dec. 17, 2002

(86) PCT No.: PCT/JP02/13158

§ 371 (c)(1), (2), (4) Date: Jun. 17, 2004

(87) PCT Pub. No.: WO03/054848

PCT Pub. Date: Jul. 3, 2003

(65) Prior Publication Data

US 2005/0160364 A1    Jul. 21, 2005

(30) Foreign Application Priority Data

Dec. 21, 2001    (JP) .............................. 2001-390133

(51) Int. Cl.
*G06F 3/00* (2006.01)
*G09G 5/36* (2006.01)
(52) U.S. Cl. ...................... 715/718; 345/558
(58) Field of Classification Search ................. 715/718, 715/730; 345/603, 558, 460, 555
See application file for complete search history.

(56) References Cited

U.S. PATENT DOCUMENTS

| | | | | |
|---|---|---|---|---|
| 5,557,342 A | * | 9/1996 | Eto et al. .................... | 348/706 |
| 5,563,665 A | * | 10/1996 | Chang ........................ | 348/552 |
| 5,815,216 A | * | 9/1998 | Suh ............................ | 348/588 |
| 6,052,740 A | * | 4/2000 | Frederick .................... | 710/8 |
| 6,119,172 A | * | 9/2000 | Belmont et al. ............. | 709/250 |
| 6,300,980 B1 | * | 10/2001 | McGraw et al. ............. | 348/552 |
| 6,326,935 B1 | * | 12/2001 | Boger ........................ | 345/3.2 |
| 6,356,971 B1 | * | 3/2002 | Katz et al. .................. | 710/301 |
| 6,683,649 B1 | * | 1/2004 | Anderson .............. | 348/333.05 |
| 6,724,351 B1 | * | 4/2004 | Boger ........................ | 345/3.2 |
| 2002/0082730 A1 | * | 6/2002 | Capps et al. .................. | 700/94 |

FOREIGN PATENT DOCUMENTS

| | | | |
|---|---|---|---|
| JP | 5-41834 | | 2/1993 |
| JP | 7-66992 | | 3/1995 |
| JP | 08278772 A | * | 10/1996 |
| JP | 2000-4410 | | 1/2000 |
| JP | 2000-181419 | | 6/2000 |
| JP | 3081780 | | 11/2001 |
| JP | 2002-169497 | | 6/2002 |
| JP | 2002-185882 | | 6/2002 |

* cited by examiner

*Primary Examiner*—Tadesse Hailu
*Assistant Examiner*—Nicholas S Ulrich
(74) *Attorney, Agent, or Firm*—Wenderoth, Lind & Ponack, L.L.P.

(57) ABSTRACT

A personal computer (101) includes a control signal output unit (104) that outputs, to a display device (113), a control signal for switching between a TV format video signal and a computer format video signal while the display device (113) includes an input switching unit (114) operable to perform, based on the control signal outputted from the personal computer (101), input switching, for display, between the TV format video signal and the computer format video signal.

9 Claims, 11 Drawing Sheets

| Item number | Type of contents | File name |
|---|---|---|
| 1 | TV video content | video1 |
| 2 | TV video content | video2 |
| 3 | Presentation | presentation1 |
| 4 | TV video content | video3 |
| 5 | Presentation | presentation2 |
| 6 | TV video content | video4 |
| 7 | Presentation | presentation3 |
| 8 | Presentation | presentation4 |
| 9 | Presentation | presentation5 |
| 10 | TV video content | video5 |
| 11 | TV video content | video6 |
| 12 | TV video content | video7 |
| 13 | TV video content | video8 |
| 14 | Presentation | presentation6 |

Play list

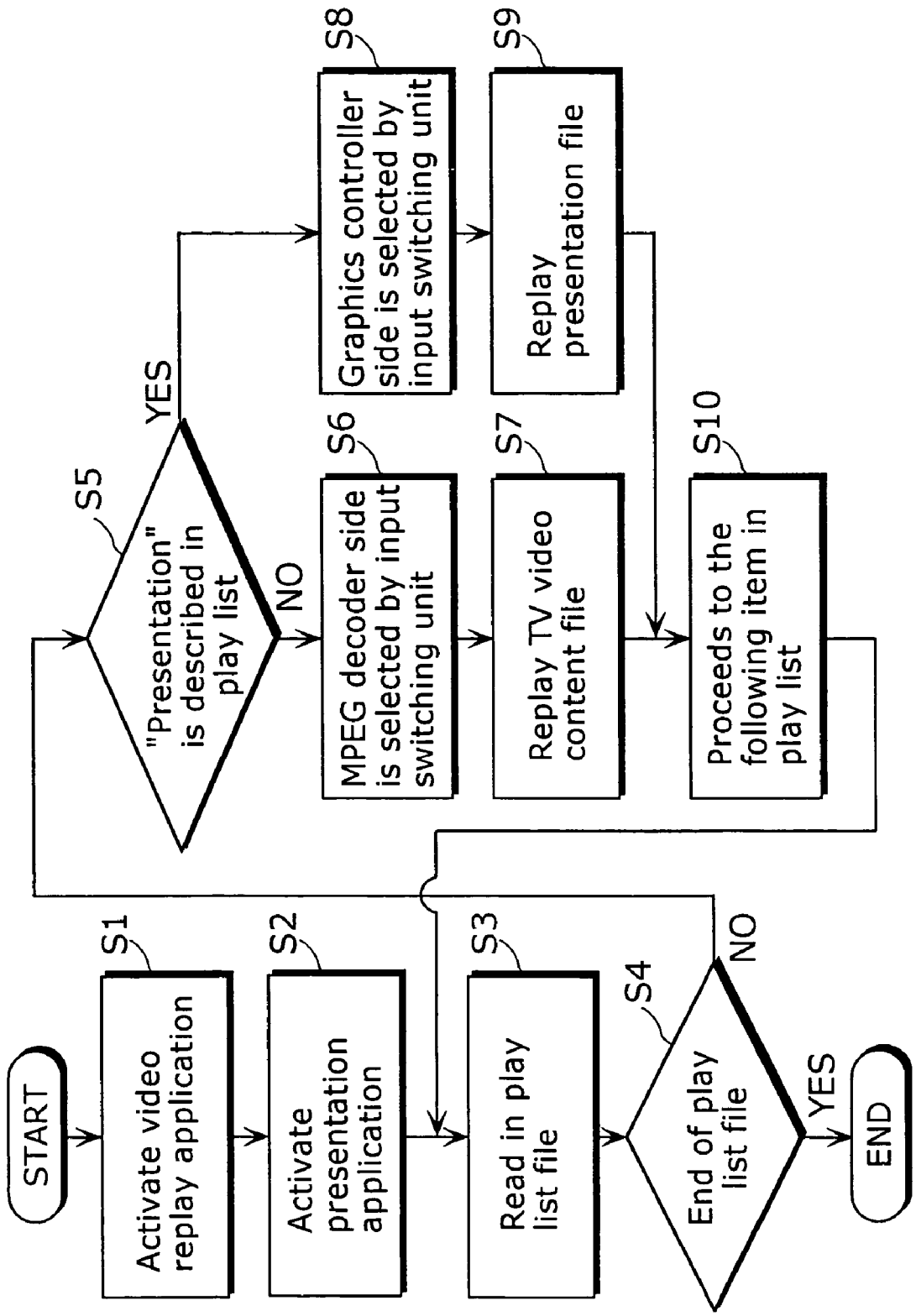

FIG. 7

| | Type of contents | File name | Time to start replay | Time to end replay |
|---|---|---|---|---|
| 1 | TV video content | video1 | 9:00 | 9:10 |
| 2 | TV video content | video2 | 9:10 | 9:30 |
| 3 | Presentation | presentation1 | 9:30 | 9:50 |
| 4 | TV video content | video3 | 9:50 | 10:00 |
| 5 | Presentation | presentation2 | 10:00 | 11:00 |
| 6 | TV video content | video4 | 11:00 | 11:20 |
| 7 | Presentation | presentation3 | 11:20 | 11:50 |
| 8 | Presentation | presentation4 | 11:50 | 12:10 |
| 9 | Presentation | presentation5 | 12:10 | 13:10 |
| 10 | TV video content | video5 | 13:10 | 14:20 |
| 11 | TV video content | video6 | 14:20 | 15:00 |
| 12 | TV video content | video7 | 15:00 | 16:30 |
| 13 | TV video content | video8 | 16:30 | 17:00 |
| 14 | Presentation | presentation6 | 17:00 | 18:00 |

Play list

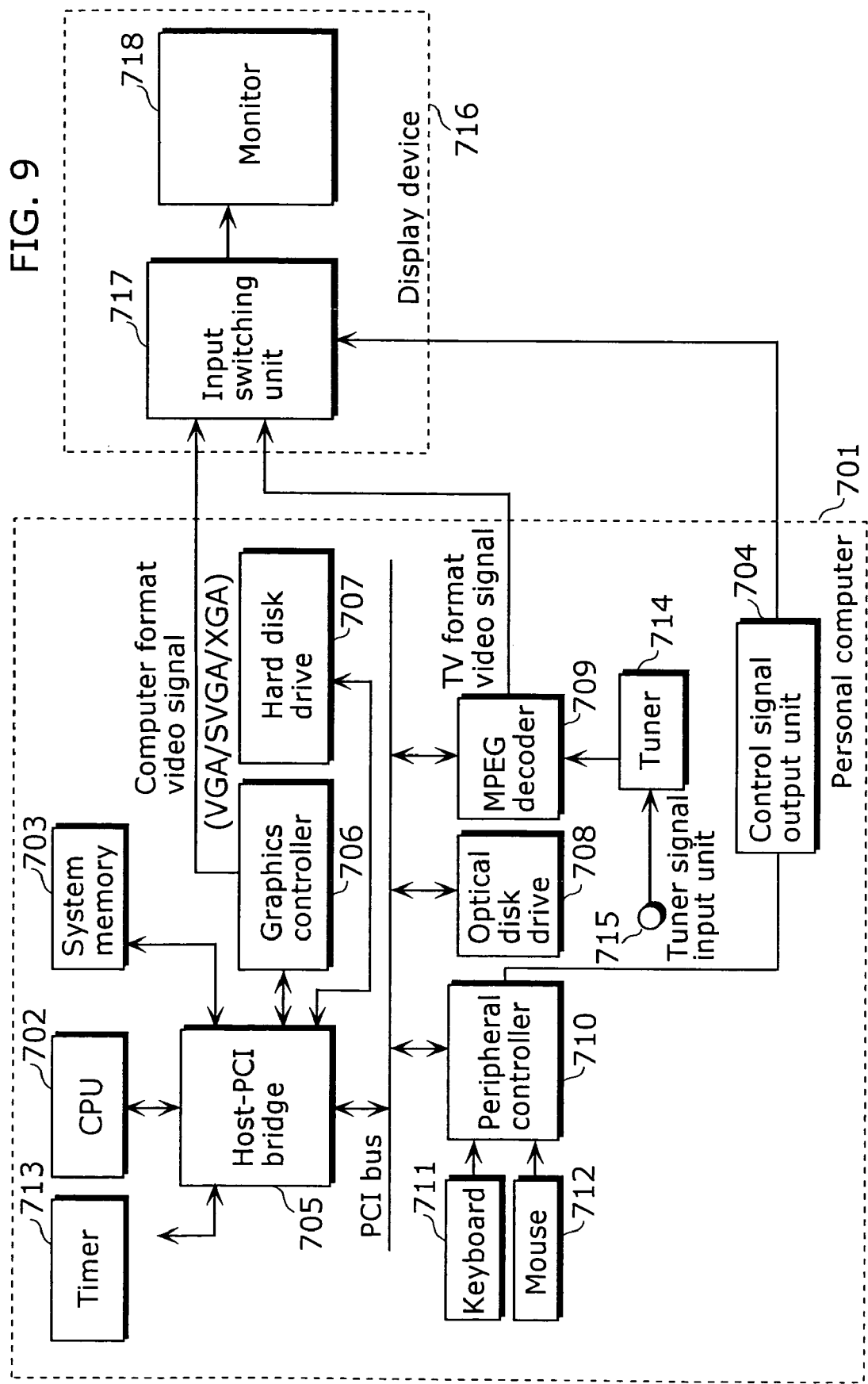

FIG. 10

| | Type of contents | File name | Time to start replay | Time to end replay | Selected channel |
|---|---|---|---|---|---|
| 1 | TV video content | video1 | 9:00 | 9:10 | - |
| 2 | TV broadcast display | - | 9:10 | 9:30 | 4 |
| 3 | Presentation | presentation1 | 9:30 | 9:50 | |
| 4 | TV video content | video3 | 9:50 | 10:00 | |
| 5 | Presentation | presentation2 | 10:00 | 11:00 | |
| 6 | TV video content | video4 | 11:00 | 11:20 | |
| 7 | Presentation | presentation3 | 11:20 | 11:50 | |
| 8 | Presentation | presentation4 | 11:50 | 12:10 | |
| 9 | Presentation | presentation5 | 12:10 | 13:10 | |
| 10 | TV broadcast display | - | 13:10 | 14:20 | 6 |
| 11 | TV video content | video6 | 14:20 | 15:00 | |
| 12 | TV video content | video7 | 15:00 | 16:30 | |
| 13 | TV broadcast display | - | 16:30 | 17:00 | 7 |
| 14 | Presentation | presentation6 | 17:00 | 18:00 | |

Play list

COMPUTER DISPLAY SYSTEM, COMPUTER APPARATUS AND DISPLAY APPARATUS

TECHNICAL FIELD

The present invention relates to a computer display system for a display based on a TV video signal and a video signal to be displayed by a computer apparatus.

BACKGROUND ART

Recently, along with the wide use of personal computers and the commercialization of a large screen display such as a Plasma Display Panel (PDP), a personal computer display system for displaying at the store with the use of the large screen display as a display of the personal computer has been increasingly put into practical use.

The personal computer display system allowing the personal computer to execute application software such as presentation software and a Web browser and display it on the large screen display is increasingly recognized as a new advertising medium.

The advertising medium, in many cases, displays a video signal in TV format such as SDTV and HDTV. In this case, optical disks such as a VTR, a DVD and a CD-R/RW are commonly used as a signal source for the video signal.

FIG. 1 is a structural diagram of the conventional personal computer display system. The personal computer display system is composed of a personal computer 1001, a VTR 1010 and a display device 1011. The personal computer 1001 includes a CPU 1002, a system memory 1003, a host-PCI bridge 1004, a graphics controller 1005, a hard disk drive 1006, a peripheral controller 1007, a keyboard 1008, and a mouse 1009. The display device 1011 has an input switching unit 1012 and a monitor 1013.

The following describes the conventional personal computer display system with reference to FIG. 1.

Firstly, a case of executing presentation software that is one of application software and displaying it on the display is explained. The presentation software is executed as in the following.

The user instructs the CPU 1002 via the peripheral controller 1007 as well as the host-PCI bridge 1004 to execute the program of the presentation software through the operation of the keyboard 1008 and the mouse 1009.

Then, the CPU 1002 reads out the program from the hard disk drive 1006 via the host-PCI bridge 1004, places, as needed, the data necessary for the system memory 1003 and executes the data.

Furthermore, in the case of executing the presentation, the CPU 1002 reads out a content file of the presentation already described in the hard disk drive 1006 through the user's operations and places the part necessary for the system memory 1003 so as to execute it. The content file is then replayed using the presentation software (i.e., an application program).

The generation of the video signal to be outputted is executed by the CPU 1002 and the graphics controller 1005. The video signal is outputted, from the graphics controller 1005 to outside in video format such as VGA, SVA and XGA, as a computer format video signal, and inputted to the display device 1011.

A dedicated input terminal for the computer format video signal such as VGA, SVGA and XGA that are video signals of the computer and a dedicated input terminal for the TV signal format are installed separately in the display device 1011. In the case of displaying an output from the graphics controller 1005, the input switching unit 1012 selects a computer format video signal that is the output from the graphics controller 1005, by operating a remote controller (although not shown in the diagram).

The video signal inputted and selected by the input switching unit 1012 is then inputted to the monitor 1013 and displayed by the monitor 1013.

In the case of displaying a TV format video signal, the VTR 1010 is required. The video is replayed by operating the VTR using the remote controller.

In the case of replaying the video, the input switching unit 1012 selects the output from the VTR 1010 by operating the remote controller. The video signal outputted from the VTR 1010 is inputted to the input switching unit 1012 and the input switching unit 1012 selects between the video signal from the VTR 1010 and the output signal outputted from the graphics controller 1005 which is outputted from the personal computer 1001. The selected video signal is outputted to the monitor 1013 and displayed by the monitor 1013.

In order to replay both the computer format video signal and the TV format video signal, the VTR 1010 capable of outputting the TV format video signal is required besides the personal computer 1001, as shown in FIG. 1. This means that at least two apparatuses are required as signal resources for display.

Meanwhile, the problem is that it is not possible to perform the detailed control on a replay of the content, e.g., switching between the presentation software and the video signal at the most applicable time position, or starting the replay of the content of one presentation software after having replayed a program based on the TV format video signal. This is because the video display of the application software operated by the personal computer 1001 and the video display operated by the VTR 1010 cannot cooperate because the operations between the personal computer 1001 and the VTR 1010 cannot be controlled.

Speaking of operations, the control over three apparatuses: the personal computer 1001, the VTR 1010 and the display device 1011, is required so that the operations are complicated.

An aim of the present invention is to replay the presentation content as well as the video content, as intended by the user through the operations only of the personal computer, by allowing the CPU's control over video decoding, the cooperation between the TV format video signal and the computer format video signal, and also, the input switching performed by the display device.

Another aim of the present invention is to set one apparatus as a signal source by placing the signal source of the video signal in the personal computer.

SUMMARY OF THE INVENTION

The computer display system according to the present invention is a computer display system comprising a computer apparatus and a display device, wherein the computer apparatus includes: a video decoding unit operable to decompress a compressed video signal and output a TV format video signal; a video output unit operable to output a computer format video signal; and a control signal output unit operable to output, outside the computer apparatus, a control signal for switching between the TV format video signal and the computer format video signal, and the display device includes a video signal switching unit operable to perform, based on the control signal outputted from the computer apparatus, input switching, for display, between the TV format video signal and the computer format video signal.

Thus, the control signal is outputted according to the video signal outputted by the computer apparatus. The display device can therefore output the TV format video signal or the computer format video signal by switching between them based on the control signal.

The computer apparatus may further includes a play list control unit operable to execute application software or replay a video file, based on a play list held in a storage medium, the play list including descriptions of a video file name of the compressed video signal and a file name of the application software, as items to be replayed, the video output unit outputs the computer format video signal based on the execution of the application software, and the control signal output unit outputs the control signal based on the execution of the application software or the replay of the video file that is performed by the play list control unit.

Thus, the execution of the application software or the replay of the video file is performed based on the play list, according to which the display device can output the TV format video signal or the computer format video signal by switching between them.

It should be noted that the present invention can be realized not only as such computer display system but also as a computer apparatus or a display device, as a video display method in which the units in such computer display system are included as steps and even as a program for causing the computer apparatus to execute these steps. Such program can surely be distributed via a storage medium like a CD-ROM or a transmission medium like the Internet. The present invention can be realized also as a storage medium on which the play list used in the computer display system is recorded.

BRIEF DESCRIPTION OF DRAWINGS

FIG. 4 is a diagram showing the play list file to be used in the personal computer system according to the second embodiment of the present invention.

FIG. 5 is a flowchart showing an example of the operation performed in the personal computer display system according to the second embodiment of the present invention.

FIG. 7 shows a play list file to be used in the personal computer display system according to the third embodiment of the present invention.

FIG. 9 is a block diagram showing the configuration of the personal computer display system according to the fourth embodiment of the present invention.

FIG. 10 is a diagram showing the play list file to be used in the personal computer display system according to the fourth embodiment of the present invention.

BEST MODE FOR CARRYING OUT THE INVENTION

The following describes the embodiments of the present invention with reference to the drawings.

First Embodiment

Figure 1:
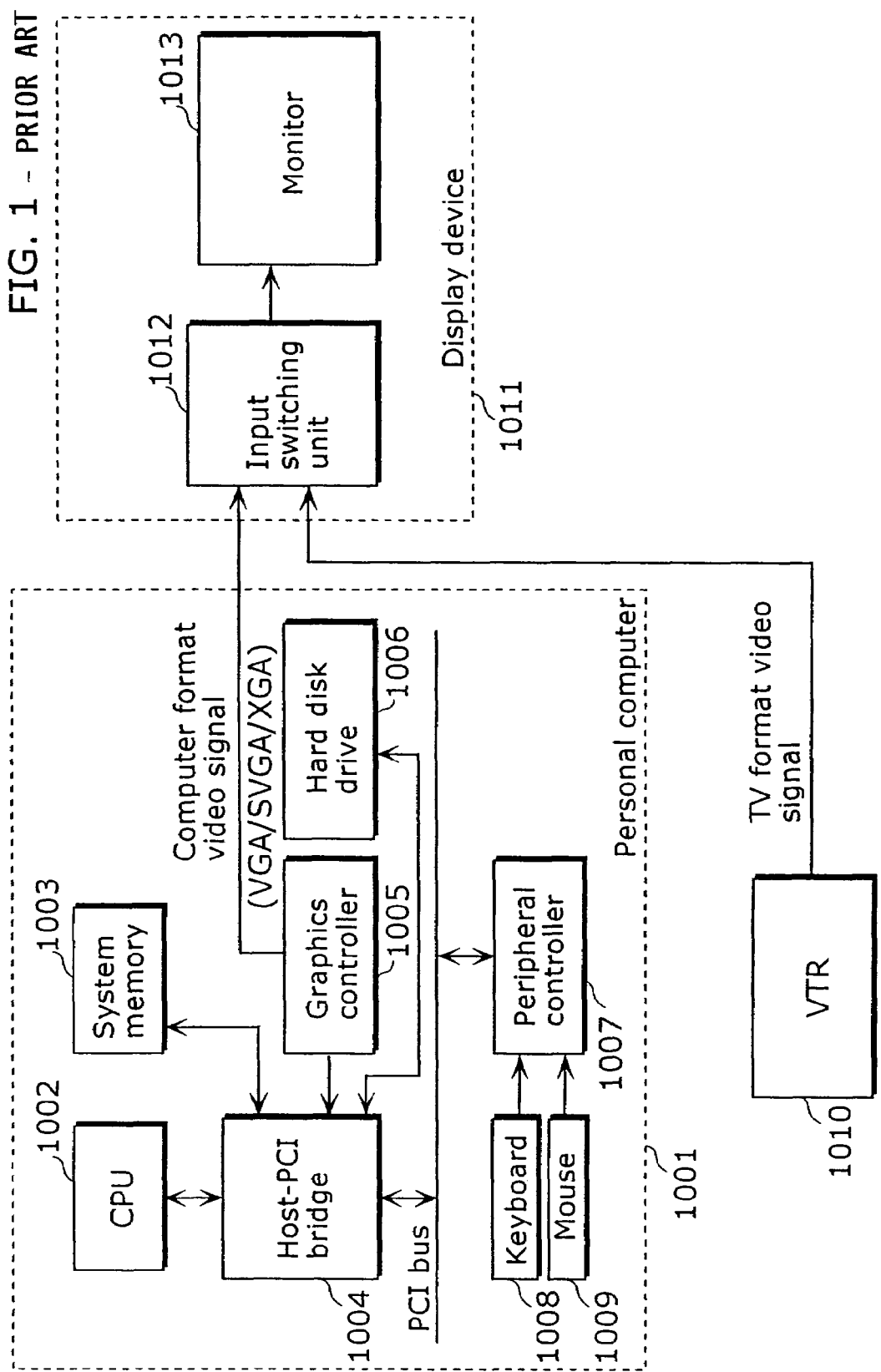
FIG. 1 is a block diagram showing the configuration of the conventional personal computer display system.
Figure 2:
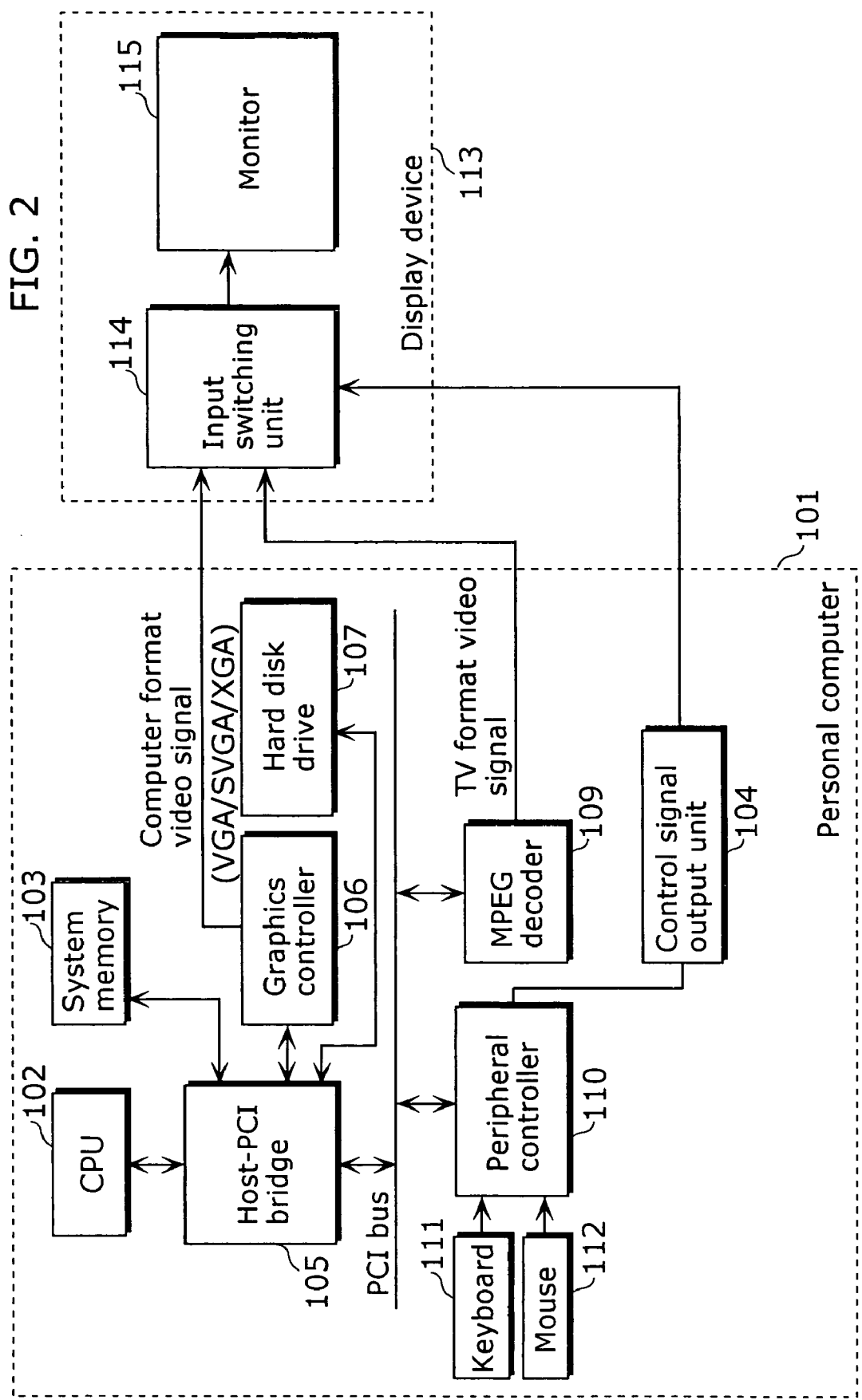
FIG. 2 is a block diagram showing the configuration of the personal computer display system according to the first embodiment of the present invention.

FIG. 2 is a block diagram showing the configuration of the personal computer display system according to the first embodiment of the present invention.

The present personal computer display system is a system for displaying the video outputted by executing the application software and the video included in the TV video content, and is composed of a personal computer 101 and a display device 113. The personal computer 101 includes a CPU 102, a system memory 103, a control signal output unit 104, a host-PCI bridge 105, a graphics controller 106, a hard disk drive 107, an MPEG decoder 109, a peripheral controller 110, a keyboard 111 and a mouse 112. The display device 113 includes an input switching unit 114 and a monitor 115.

In the hard disk drive 107, the application programs such as operating system software, TV format video replay application program (hereafter to be referred to as "video replay application") and presentation software (hereafter to be referred to as "presentation application") are stored.

The control signal output unit 104 outputs a control signal for switching between the TV format video signal outputted based on the video replay application and the computer format video signal outputted based on the presentation application. Here, the computer format video signal is a video signal such as an analog RGB signal and a digital RGB signal to be outputted in video format such as VGA, SVGA and XGA.

<Case of Outputting a TV Format Video Signal>

Firstly the operation of replaying a TV video content by means of the user's operations will be explained.

The user activates a video replay application from the hard disk drive 107 by operating the keyboard 111 and the mouse 112. Then, the user selects a file of the TV video content stored in the hard disk drive 107, using the activated video replay application.

The user then operates the replay of the TV video content stored in the hard disk drive with the use of the video replay application activated by the operations of the keyboard 111 and the mouse 112.

It should be noted that the TV video content to be replayed shall be compressed by the MPEG 2.

The CPU 102 instructs, through such operations, the control signal output unit 104 to output an input switching signal so that the TV format video signal is selected, via the host-PCI bridge 105 and the peripheral controller 110. The control signal output unit 104 outputs to the display device 103 the input switching signal for switching between the computer format video signal and the TV format video signal.

At the same time, the CPU 102 reads out the compressed video signal from the hard disk drive 107 and transfers it to the MPEG decoder 109. The MPEG decoder 109 decompresses the compressed video signal transferred, and outputs the TV format video signal to the display device 113.

In the display device 113, the input switching unit 114 selects the TV format video signal based on the input switching signal, and the monitor 115 displays the TV format video signal.

<Case of Outputting a Computer Format Video Signal>

The following describes the method of activating a presentation application through the user's operations, and displaying a presentation file (i.e., a replay file).

The user activates the presentation application from the hard disk drive 107 by operating the keyboard 111 and the mouse 112. The user then selects and replays the presentation file based on the activated presentation application. In this case, the CPU 102 instructs the control signal output unit 104 to output, via the host-PCI bridge 105 and the peripheral controller 106, the input switching signal so that the computer format video signal outputted by the graphics controller 106 is selected. The control signal output unit 104 outputs to the display device 113 the input switching signal for switching between the computer format video signal and the TV format video signal, based on the instruction.

The CPU 102 and the graphics controller 106 generate a computer format video signal and output the signal to the display device 113 through the operation of replaying the presentation file.

In the display device 113, the input switching unit 114 selects the computer format video signal based on the input switching signal, and the monitor 115 displays the computer format video signal.

As described above, in the case of activating a video replay application, the user instructs the control signal output unit 104 to allow the input switching unit 114 to select the output from the MPEG decoder 109. In the case of replaying the application which allows the computer format video signal to be outputted, it is possible to allow the input switching unit 114 to select the computer format video signal to be outputted from the graphics controller 106.

Thus, according to the embodiment of the present invention, the user can select the display of either the computer format video signal or the TV format video signal and perform the control by operating only the personal computer, instead of operating both the personal computer 101 and the display device 113.

Also, the apparatus with a low cost and a small space can be realized since the TV format video signal and the computer format video signal being an output signal of the computer screen such as VGA, SVGA and XGA can be outputted from one apparatus, without using two apparatuses: an apparatus like a VTR for generating a TV format video signal; and a personal computer.

It should be noted that the present embodiment has shown the case of using the presentation application as an application program, but it may be computer software such as a Web browser whose file to be replayed is an HTML file or the computer software which functions principally to display characters, drawings and photos on the computer screen.

In the present embodiment, the control signal output unit 104 is connected to the CPU 102 via the peripheral controller 110, but it may be connected directly to a PCI bus in a format of PCI board and connected to the CPU 102 via the host-PCI bridge 105.

It is also described, in the present embodiment, that the decoder of Moving Picture Experts Group (MPEG) 2 is used as hardware for performing video decoding, however, another decoder for video compression coding of the MPEG 4 may be used instead. The TV video content stored in the personal computer may be the TV video content that is video coded by the MPEG 4.

It is also described that the display device 113 includes the input switching unit 114 in the present embodiment. The present invention, however, is not limited to this, and the personal computer 101 may include the input switching unit 114 instead.

Second Embodiment

Figure 3:
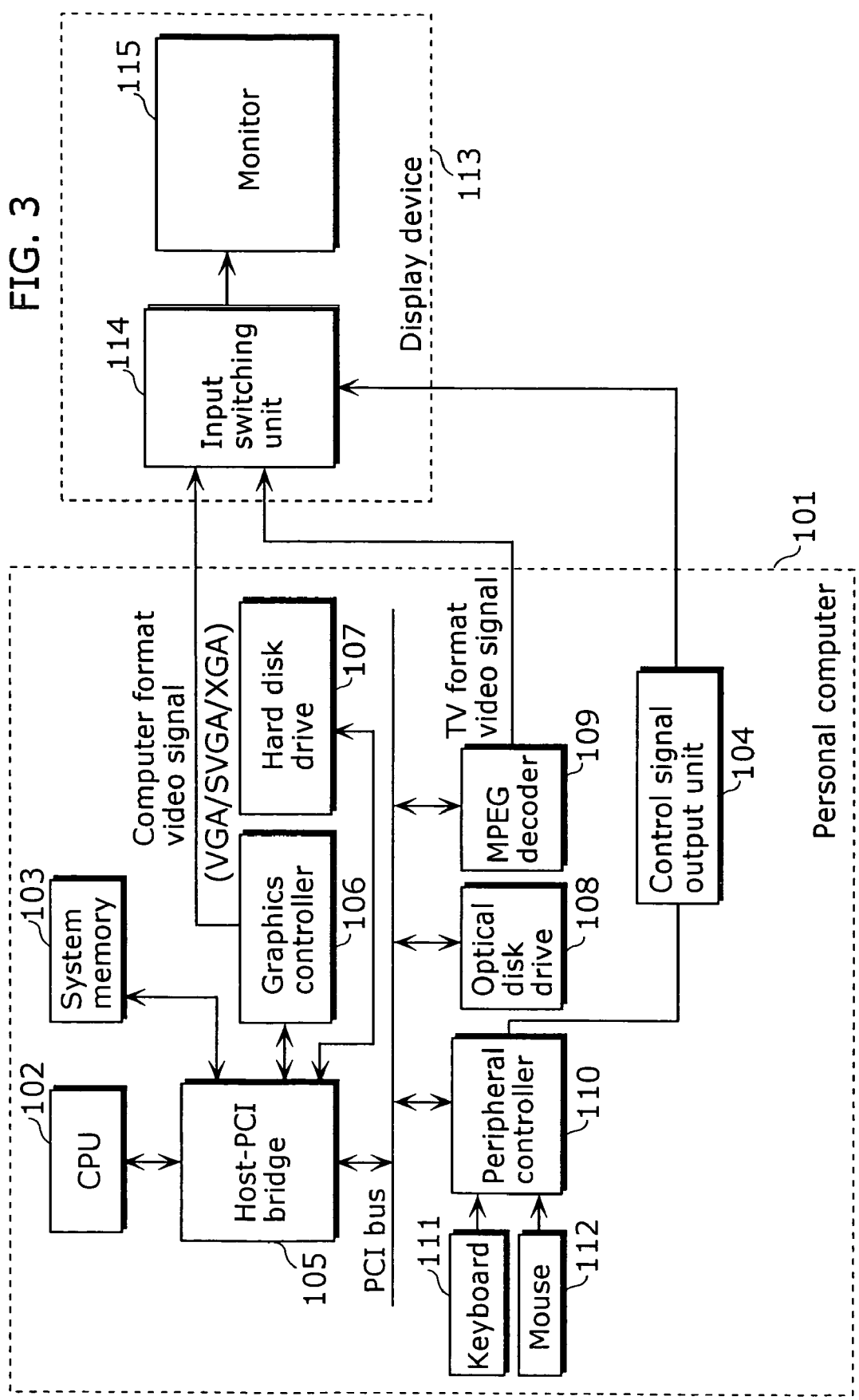
FIG. 3 is a block diagram showing the configuration of the personal compute display system according to the second embodiment of the present invention.

FIG. 3 is a block diagram showing the configuration of the personal computer display system according to the second embodiment of the present invention. FIG. 4 is a diagram showing the play list file to be used in the personal computer display system being the embodiment of the present invention. FIG. 5 is a flowchart showing the operation performed in the personal computer display system being the embodiment of the present invention.

The second embodiment of the personal computer display system of the present invention will be explained with reference to FIGS. 3 through 5. The same reference numerals are put for the same units shown in the FIG. 3 as those described in FIG. 2, and the description is omitted. The optical disk on which the play list to be used in the second embodiment is recorded is stored in the optical disk drive 108 shown in FIG. 3. Here, the play list is a list of files in order to display a replay, in which the file names of TV video contents and application software are described as the items to be replayed.

The operation performed in the personal computer display system according to the present embodiment will be explained with reference to the flowchart in FIG. 5.

Firstly, a video replay application (for processing a TV format video signal) is activated (Step S1) and a presentation application (for processing a computer format video signal) is activated (Step S2). Both of the application programs are read out from the hard disk drive 107 by the CPU 102 and then executed.

Then, the CPU 102 reads out the play list file recorded in the optical disk stored in the optical disk drive 108 (Step S3). In the play list file, a type of contents indicating either a replay file of "TV video content" (i.e., TV format video signal) or a replay file for "presentation" use (i.e., computer format video signal) as well as the file names to be replayed are described, as shown in FIG. 4.

For example, the items 1 and 2 in the play list file shown in FIG. 4 are the video in TV format while the item 3 is the video in computer format (described as "presentation" in FIG. 4).

Next, the CPU 102 judges whether or not the item "end" in the play list file has been read out (Step S4). In the case where the item has been read out, the operation terminates. In the case where the item has not been read out yet, the CPU 102 reads in the part of the type of contents described in the play list, and judges whether the type of contents to be replayed is "presentation" or not (Step S5).

In the case where the type of contents is "presentation", the CPU 102 instructs the control signal output unit 104 to output an input switching signal so that the computer format video signal is selected. According to the instruction, the control signal output unit 104 outputs, to the display device 113, the input switching signal to make the computer format video signal is selected. The input switching unit 114 in the display device 113 selects the computer format video signal outputted from the graphics controller 106 so that the monitor 115 outputs the signal (Step S8).

The CPU 102 then executes the presentation application while reading out the replay file of the presentation application recorded on the optical disk stored in the optical disk drive 108. The CPU 102 and the graphics controller 106 generate a computer format video signal and output it as an output signal of the graphics controller 106. The outputted signal is outputted to the monitor 115 via the input switching unit 114 (Step S9). When the replay file replayed by the representation application is terminated, the CPU 102 proceeds to the following item number in the play list (Step S10). After that, the CPU 102 returns to the processing of judging whether or not the item "end" in the play list file has been read out (Step S4).

In the case where the type of contents is "TV video content" in the processing of judging whether the type of the contents to be replayed is "presentation" or not (Step S5), the CPU 102 instructs the control signal output unit 104 to output an input switching signal to make a TV format video signal is selected. According to the instruction, the control signal output unit 104 outputs, to the display device 113, the input switching signal so that a TV format video signal is selected. The input switching unit 114 in the display device 113 selects the TV format video signal that is outputted from the MPEG decoder 109 so that and the monitor 115 outputs the signal (Step S6).

Next, the CPU 102 reads out the compressed video signal from the hard disk drive 107 and transfers the signal to the MPEG decoder 109. The MPEG decoder 109 decompresses the compressed video signal transferred, and outputs the TV format video signal to the display device 113 (Step S7). When the replay of the replay file of the TV video content is terminated, the CPU 102 proceeds to the following item number in the play list (Step S10) After that, the operation returns to the processing of judging whether or not the item "end" in the play list file has been read out (Step S4).

Thus, the second embodiment that is developed further from the first embodiment of the present invention can have an automatic replay function that is independent from the user's operation, by enabling the replay of the program with the use of the play list file.

As in the first embodiment, the present personal computer display system is equipped with the function to switch the display device depending on whether it is the replay of the TV video content or the replay of the application in the personal computer and it is possible to operate the program in the display device.

It should be noted that the play list shown in FIG. 4, the replay file of the presentation application, and furthermore, the replay file of the TV video content are described in the optical disk file to be read out from the optical disk drive 108.

Therefore, in the case where the configuration of the personal computer display system as shown in the second embodiment is provided, the program of the files that are already planned can be replayed only by inserting the optical disk. This facilitates the distribution and transfer of the content created in a distant place, and also, provides a user-friendly personal computer display system.

The present embodiment has shown the case of using the presentation application as an application program, but it may be computer software such as a Web browser whose file to be replayed is an HTML file or the computer software which functions principally to display characters, drawings and photos on the computer screen.

In the present embodiment, the control signal output unit 104 is connected to the CPU 102 via the peripheral controller 110, but it may be connected directly to a PCI bus in a format of PCI board and connected to the CPU 102 via the host-PCI bridge 105.

It is described, in the present embodiment, that the decoder of the MPEG 2 is used as hardware for performing video decoding, however, another decoder for video compression coding of the MPEG 4 may be used instead. The TV video content stored in the personal computer may be the TV video content that is video coded by the MPEG 4.

It is also described that the display device 113 includes the input switching unit 114 in the present embodiment. The present invention, however, is not limited to this, and the personal computer 101 may include the input switching unit 114 instead.

Third Embodiment

Figure 6:
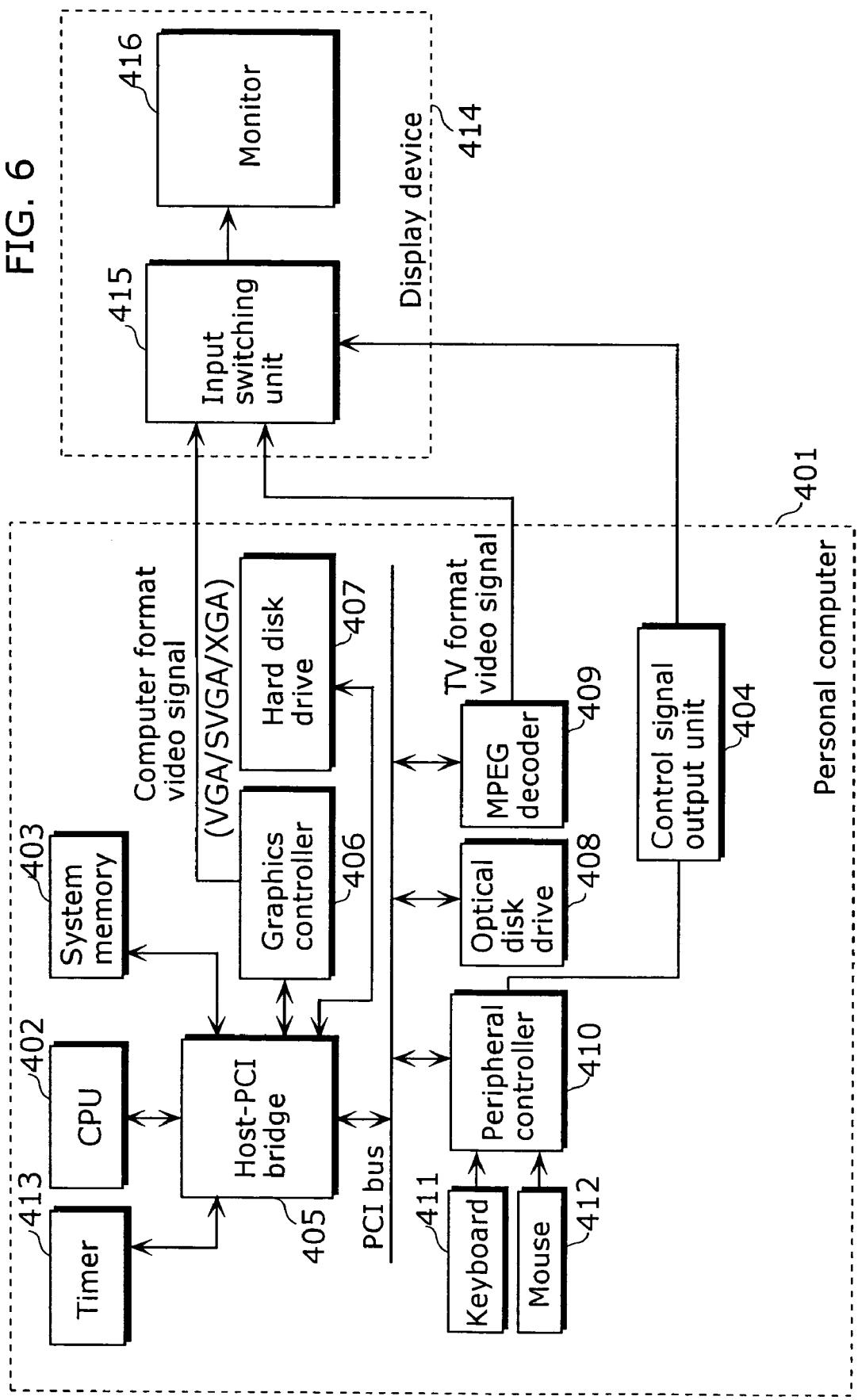
FIG. 6 is a block diagram showing the configuration of the personal computer display system according to the third embodiment of the present invention.
Figure 8:
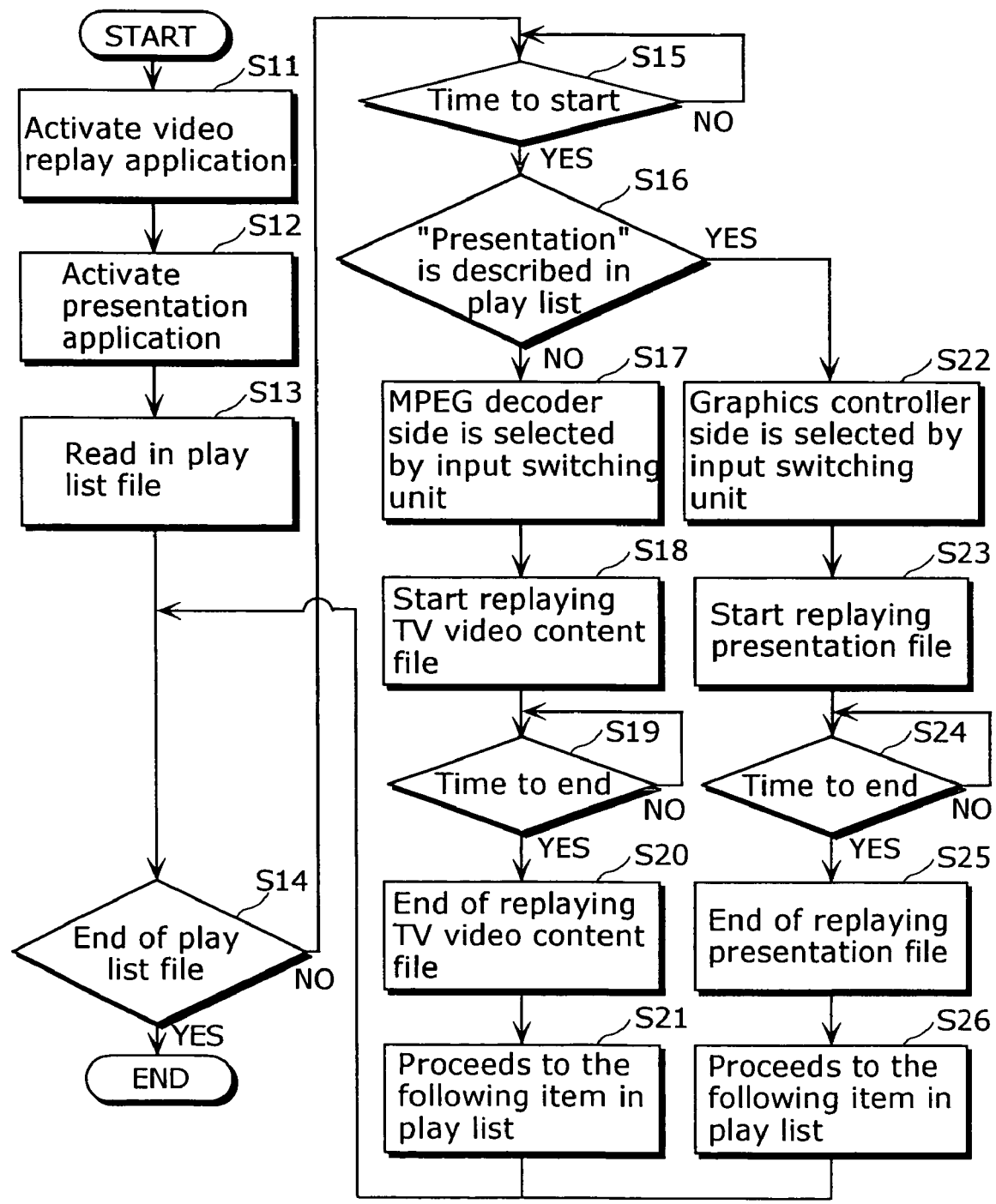
FIG. 8 is a flowchart showing an example of the operation performed in the personal computer display system according to the third embodiment of the present invention.

The personal computer display system according to the third embodiment of the present invention will be explained with reference to FIGS. 6 through 8. FIG. 6 is a block diagram showing the configuration of the personal computer display system according to the third embodiment of the present invention. FIG. 7 is a diagram showing the play list file to be used in the personal computer display system according to the third embodiment of the present invention. FIG. 9 is a flowchart showing the operation to be performed in the personal computer display system according to the third embodiment of the present invention.

The present personal computer display system is a system for displaying the video outputted from the application software and the video of the TV video content, and comprises a personal computer 401 and a display device 414. The personal computer 401 includes a CPU 402, a system memory 403, a control signal output unit 404, a host-PCI bridge 405, a graphics controller 406, a hard disk drive 407, an optical disk drive 408, an MPEG decoder 409, a peripheral controller 410, a keyboard 411, a mouse 412 and a timer 413. The display device 414 includes an input switching unit 415 and the monitor 416.

The application programs such as operating system software, video replay application and presentation application are stored in the hard disk drive 407.

The personal computer display system of the present embodiment includes the timer 413, and manages the start and end of replay according to time, by describing a time to start replaying and a time to end replaying in the play list file.

The operation performed in the personal computer display system according to the present invention will be explained with reference to the flowchart in FIG. 8.

Firstly, a video replay application is activated (Step S11) and then a presentation application is activated (Step S12). Both of the programs are read out from the hard disk drive 407 by the CPU 402, and then executed. Next, the CPU 402 reads out the play list file recorded on the optimal disk stored in the optical disk drive 408 (Step S13). As shown in FIG. 7, the followings are described in the play list file: types of contents indicating that the content is either the replay file of "TV video content" or the replay file for "presentation" use; names of the files to be replayed; the time to start replaying; and the time to end replaying.

Next, the CPU 402 judges whether or not the item "end" in the play list file has been read out (Step S14). In the case where the item has been read out, the operation terminates. In the case where the item has not been read out, the CPU 402 judges whether or not the time to start replaying has come (Step S15). In the case where the time to start replaying has not come, the CPU 402 waits until the time comes, without shifting to the next state.

In the case where the starting time has come, the CPU 402 reads in the part of the type of contents described in the play list and judges whether the type of the contents to be replayed is "presentation" or not (Step S16). Here, in the case where the type of contents is "presentation", the CPU 402 instructs the control signal output unit 404 to output an input switching signal so that a computer format video signal is selected. According to the instruction, the control signal output unit 404 outputs, to the display device 414, the input switching signal so that a computer format video signal is selected. The input switching unit 415 in the display device 414 selects the computer format video signal outputted from the graphics controller 406 so that the monitor 416 outputs the signal (Step S22).

The CPU 402 then executes the presentation application while reading out the replay file of the presentation application recorded in the optical disk stored in the optical disk drive 408. The CPU 402 and the graphics controller 406 generate a computer format video signal and the graphics controller 406 outputs the signal. The outputted input switching signal is outputted to the monitor 416 via the input switching unit 415 (Step S23).

The CPU 402 then verifies whether or not the time to end replaying has come. Here, the CPU 402 judges whether or not the ending time has come by obtaining the time information from the timer 413 (Step S24). When the time to end replaying the replay file based on the presentation application has come, the CPU 402 terminates the replay of the replay file (Step S25), then proceeds to the next item number in the play list (Step S26) and after that, the returns to the processing of judging whether or not the item "end" in the play list file has been read out (Step S14).

In the case where the type of contents is "TV video content" in the processing of judging whether or not the type of the contents to be replayed is "presentation" or not (Step S16), the CPU 402 instructs the control signal output unit 404 to output an input switching signal so that a TV format video signal is selected. The control signal output unit 404 outputs, to the display device 414, the input switching signal so that a TV format video signal is selected. The input switching unit 415 in the display device 414 selects the TV format video signal outputted from the MPEG decoder 409 so that the monitor 416 outputs the signal (Step S17).

Next, the CPU 402 reads out the compressed video signal from the replay file of the TV video content recorded in the optical disk stored in the optical disk drive 408, and transfers the signal to the MPEG decoder 409. The MPEG decoder 409 decompresses the compressed video signal transferred, and outputs the TV format video signal to the display device 414 (Step S18).

The CPU 402 then verifies whether or not the time to end replaying has come. Here, the CPU 402 judges whether or not the ending time has come by obtaining the time information from the timer 413 (Step S19). When the time to end replaying the TV video content has come, the CPU 402 terminates the replay of the TV video content (Step S20). Then, the CPU 402 proceeds to the next item number in the play list (Step S21), and after that, returns to the processing of judging whether or not the item "end" in the play list file has been read out (Step S14).

Thus, in addition to the second embodiment, the present invention can have a function to replay according to time since it is equipped with a function to replay the program based on the time information.

It should be noted that in the optical disk file to be replayed by the optical disk drive 408, the followings are described: the play list shown in FIG. 7; an execution file to be executed by the application program; and a video content file.

Therefore, in the case where the configuration of the personal computer display system shown in the second embodiment is provided, the program of the files that are already planned can be replayed only by inserting the optical disk. This facilitates the distribution and transfer of the content created in a distant place, and also, provides a user-friendly personal computer display system.

It should be noted that in the present embodiment, it is described that the play list file, the presentation application replay file and the TV video content are recorded in the optical disk stored in the optical disk drive. The effects are the same, however, in the case where they are stored in a hard disk drive.

Also, the present embodiment has shown the case of using the presentation application as an application program, but it may be computer software such as a Web browser whose file to be replayed is an HTML file or the computer software which functions principally to display characters, drawings and photos on the computer screen.

In the present embodiment, the control signal output unit 404 is connected to the CPU 402 via the peripheral controller 410, but it may be connected directly to a PCI bus in a format of PCI board and connected to the CPU 402 via the host-PCI bridge 405.

It is described, in the present embodiment, that the decoder of the MPEG 2 is used as hardware for performing video decoding, however, another decoder for video compression coding of the MPEG 4 may be used instead. The TV video content stored in the personal computer may be the TV video content that is video coded by the MPEG 4.

It is also described that the display device 414 includes the input switching unit 415 in the present embodiment. The present invention, however, is not limited to this, and the personal computer 401 may include the input switching unit 415 instead.

Fourth Embodiment

Figure 11:
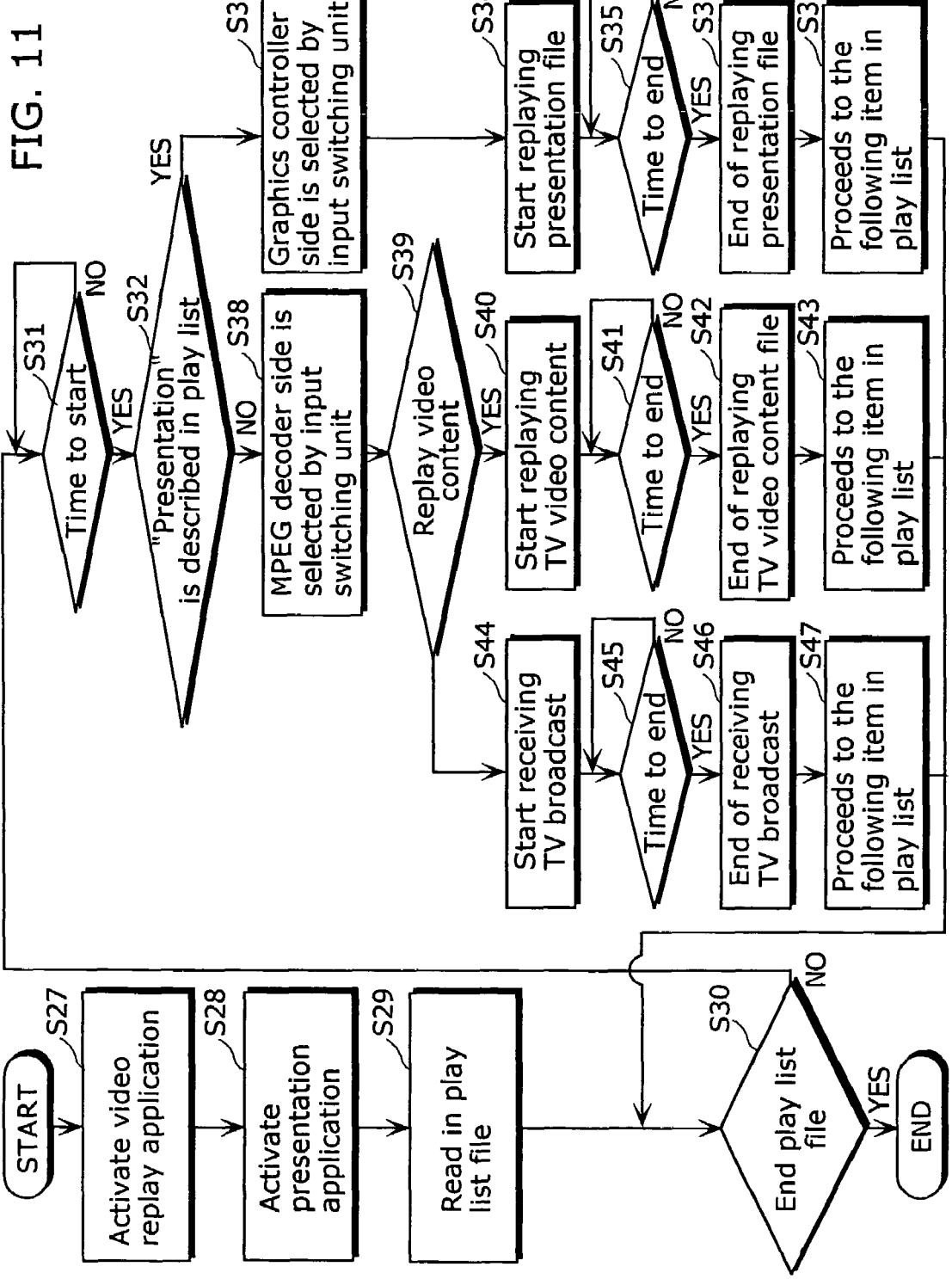
FIG. 11 is a flowchart showing an example of the operation performed in the personal computer display system according to the fourth embodiment of the present invention.

The personal computer display system according to the fourth embodiment of the present invention will be explained with reference to FIGS. 9 through 11.

FIG. 9 is a block diagram showing the configuration of the personal computer display system according to the fourth embodiment of the present invention. FIG. 10 is a diagram showing the play list file to be used in the personal computer display system according to the fourth embodiment of the present invention. FIG. 11 is a flowchart showing the operation performed in the personal computer display system according to the fourth embodiment of the present invention.

The present personal computer display system is a system for displaying the video outputted by application software, the video in the TV video content as well as that of the TV broadcast, and comprises a personal computer 701 and a display device 716. The personal computer 701 includes a CPU 702, a system memory 703, a control signal output unit 704, a host-PCI bridge 705, a graphics controller 706, a hard disk drive 707, an optical disk drive 708, an MPEG decoder 709, a peripheral controller 710, a keyboard 711, a mouse 712, a timer 713, a tuner 714 and a tuner signal input unit 715. The display device 716 includes an input switching unit 717 and a monitor 718.

The application programs such as operating system software, a video replay application and a presentation application are stored in the hard disk drive 707.

The tuner 714 demodulates a TV signal inputted from the tuner signal input unit 715.

The operation performed in the personal computer display system according to the present invention will be explained with reference to the flowchart in FIG. 11.

Firstly, a video replay application (Step S27) and a presentation application (Step S28) are activated simultaneously when the personal computer is booted up. Both of the application programs are executed by reading them out. The CPU 702 then reads out the play list file recorded on the optical disk (Step S29). As for the reading out, the necessary part is transferred to the system memory 703 and the data is recognized by the CPU 702. As shown in FIG. 10, the followings are described in the play list file: types of contents indicating that the content is either the replay file of "TV video content" or the replay file for "presentation" use; names of the files to be replayed; the time to start replaying; and the time to end replaying.

Next, the CPU 702 judges whether or not the item "end" in the play list file has been read out (Step S30). In the case where the item has been read out, the operation of replaying the play list file terminates. In the case where the item has been read out, the CPU 702 judges whether or not the time to start replaying has come (Step S31). In the case where the time to start replaying has not come, the CPU 702 waits until the time comes, without shifting to the next state.

In the case where the time has come, the CPU 702 reads in the part of the type of contents described in the play list and judges whether the type of the contents to be replayed is "presentation" or not (Step S32). Here, in the case where the type of contents is "presentation", the CPU 702 instructs the control signal output unit 704 to output an input switching signal so that a computer format video signal is selected. According to the instruction, the control signal output unit 704 outputs, to the display device 716, the input switching signal so that a computer format video signal is selected. The input switching unit 717 in the display device 716 selects the computer format video signal outputted from the graphics controller 706 so that the monitor 718 outputs the signal (Step S33).

The CPU 702 then executes the presentation application while reading out the replay file of the presentation application recorded in the optical disk stored in the optical disk drive 708, according to the play list file. The CPU 702 and the graphics controller 706 generate a computer format video signal, and the graphics controller 706 outputs the signal. The outputted input switching signal is outputted to the monitor 416 via the input switching unit 717 (Step S34).

The CPU 702 then verifies whether or not the time to end replaying has come. Here, the CPU 702 judges whether the ending time has come by obtaining the time information from the timer 713 (Step S35). In the case where the time to end replaying the replay file has come, the CPU 702 terminates the replay of the replay file (Step S36). Then, the CPU 702 proceeds to the next item number in the play list (Step S37). After that, the CPU 702 returns to the processing of judging whether or not the item "end" in the play list file has been read out (Step S30).

In the case where the type of contents is other than "presentation" in the processing of judging whether or not the type of the contents to be replayed is "presentation" or not (Step S34), the CPU 702 instructs the control signal output unit 704 to output an input switching signal so that a TV format video signal is selected. The control signal generation unit 704 outputs, to the display device 716, the input switching signal so that a TV format video signal is selected. The input switching unit 717 in the display device 716 selects the TV format video signal outputted from the MPEG decoder 709 and the monitor 718 outputs the signal (Step S38).

Next, the CPU 702 reads out the compressed video signal from the replay file of the TV video content recorded in the optical disk stored in the optical disk drive 708, and transfers the signal to the MPEG decoder 709. The MPEG decoder 709 decompresses the compressed video signal transferred, and outputs the TV format video signal to the display device 716 (Step S40).

The CPU 702 then verifies whether or not the time to end replaying has come. Here, the CPU 702 judges whether or not the ending time has come by obtaining the time information from the timer 713 (Step S41). When the time to end replaying the TV video content has come, the CPU 702 terminates the replay of the TV video content (Step S42), proceeds to the next item number in the play list (Step S43), and after that, returns to the processing of judging whether or not the item "end" in the play list file has been read out (Step S30).

In the case where the type of contents is other than "TV video content" in the processing of judging whether the type of contents to be replayed is "TV video content" or not (Step S39), the tuner 714 demodulates the TV signal inputted from the tuner signal input unit 715. The MPEG decoder 709 decompresses the compressive video signal inputted from the tuner 714 and outputs the TV format video signal to the display device 716. The outputted TV format video signal is outputted to the monitor 718 via the input switching unit 717 (Step S44).

The CPU 702 then verifies whether or not the time to end replaying has come. Here, the CPU 702 judges it by obtaining the time information from the timer 713 (Step S45). When the time to end displaying the TV broadcast, the CPU 702 terminates the display (Step S46), proceeds to the following item number in the play list, and after that, returns to the processing of judging whether or not the item "end" in the play list file has been read out (Step S30).

Thus, the third embodiment being further equipped with a TV reception function enables the display of the TV video content and that of the TV broadcast which are already recorded, and what is more, the display performed by the personal computer.

It should be noted that in the present embodiment, the play list file, the replay file of the presentation application, and the TV video content are recorded on the optical disk. The effects are, however, the same in the case where they are stored in a hard disk drive.

Also, the followings are described in the optical disk to be read out by the optical disk drive 708: the play list shown in FIG. 10; an execution file to be executed by the application program; and a video content file.

Therefore, in the case where the personal computer display system with the configuration shown in the fourth embodiment is provided, the program of the files that are already planned can be replayed at a specified time and the TV broadcast can be displayed only by inserting the optical disk. It is therefore possible to provide the user with the user-friendly system.

Also, the present embodiment has shown the case of using the presentation application as an application program, but it may be computer software such as a Web browser whose file to be replayed is an HTML file or the computer software which functions principally to display characters, drawings and photos on the computer screen.

In the present embodiment, the control signal output unit 404 is connected to the CPU 702 via the peripheral controller 710, but it may be connected directly to a PCI bus in a format of PCI board and connected to the CPU 702 via the host-PCI bridge 705.

It is described, in the present embodiment, that the decoder of the MPEG 2 is used as hardware for performing video decoding, however, another decoder for video compression coding of the MPEG 4 may be used instead. The TV video content stored in the personal computer may be the TV video content that is video coded by the MPEG 4.

Also, it is described in the present embodiment that the display device 716 includes the input switching unit 717. The present invention, however, is not limited to this, and the personal computer 701 may include the input switching unit 717.

Thus, according to the present invention, the computer outputs the control signal according to the video signal to be outputted. It is therefore possible for the display device to output the TV format video signal and the computer format video signal by switching between them based on the control signal.

Also, it is possible to have an automatic replay function that is independent of the user's operations, by enabling the replay of the program with the use of the play list file.

INDUSTRIAL APPLICABILITY

Thus, the computer display system according to the present invention is applicable to the system for a display based on the TV format video signal outputted from the computer apparatus as well as the computer format video signal by switching between them according to the operation of outputting the respective video signal performed by the display device with a large screen such as a PDP (Plasma Display Panel).

The invention claimed is:

1. A computer display system comprising a computer apparatus and a display device,
    wherein the computer apparatus includes:
        a play list control unit operable to execute application software or replay a video file, based on a play list held in a storage medium, the play list including descriptions of a video file name of a compressed video signal and a file name of the application software, as items to be replayed;
        a video decoding unit operable to decompress the compressed video signal and output a TV format video signal based on the replay of the video file performed by said play list control unit;
        a video output unit operable to output a computer format video signal based on the execution of the application software performed by said play list control unit;
        a detection unit operable to detect one of the following:
            an output instruction for the computer format video signal at a time when the application software is executed by said play list control unit; and
            an output instruction for the TV format video signal at a time when the replay of the compressed video signal is executed by said play list control unit; and
        a control signal output unit operable to:
            output a control signal for instructing the display device to switch to the TV format video signal if the output instruction for the TV format video signal has been detected as a result of the detection performed by the detection unit; and
            output a control signal for instructing the display device to switch to the computer format video signal if the output instruction for the computer format video signal has been detected as a result of the detection performed by the detection unit, and
    wherein the display device includes
        a video signal switching unit operable to perform, based on the control signal outputted from the computer apparatus, input switching, for display, between the TV format video signal and the computer format video signal.

2. The computer display system according to claim 1,
    wherein the computer apparatus further includes a TV reception unit operable to receive a TV broadcast signal, and
    wherein the video decoding unit decompresses the TV broadcast signal and outputs a TV format video signal.

3. The computer display system according to claim 1
    wherein the play list control unit i) detects an end of the execution of a file that is being executed and shifts to a following item to be replayed in the play list, in the case where the application software is executed, and ii) detects an end of the replay of a video file that is being executed and shifts to a following item to be replayed, in the case where the video file is replayed.

4. The computer display system according to claim 1
    wherein the play list further includes time information relating to a time to staff the replay and a time to end the replay, and
    the play list control unit executes the application software or replays the video file, based on the time information obtained from the play list.

5. A computer apparatus for executing application software, the computer apparatus comprising:
    a play list control unit operable to execute application software or replay a video file, based on a play list held in a storage medium, the play list including descriptions of a video file name of a compressed video signal and a file name of the application software, as items to be replayed;
    a video decoding unit operable to decompress the compressed video signal and output a TV format video signal based on the replay of the video file performed by said play list control unit;
    a video output unit operable to output a computer format video signal based on the execution of the application software performed by said play list control unit;
    a detection unit operable to detect one of the following:
        an output instruction for the computer format video signal at a time when the application software is executed by said play list control unit; and
        an output instruction for the TV format video signal at a time when the replay of the compressed video signal is executed by said play list control unit; and
    a control signal output unit operable to:
        output, outside of the computer apparatus, a control signal for instructing switching to the TV format video signal if the output instruction for the TV format video signal has been detected as a result of the detection performed by the detection unit; and
        output, outside of the computer apparatus, a control signal for instructing switching to the computer format video signal if the output instruction for the computer format video signal has been detected as a result of the detection performed by the detection unit.

6. A computer apparatus comprising:
    a play list control unit operable to execute application software or replay a video file, based on a play list held in a storage medium, the play list including descriptions of a video file name of a compressed video signal and a file name of the application software, as items to be replayed;
    a video decoding unit operable to decompress the compressed video signal and output a TV format video signal based on the replay of the video file performed by said play list control unit;
    a video output unit operable to output a computer format video signal based on the execution of the application software performed by said play list control unit;
    a detection unit operable to detect one of the following:

an output instruction for the computer format video signal at a time when the application software is executed by said play list control unit; and an output instruction for the TV format video signal at a time when the replay of the compressed video signal is executed by said play list control unit;

a control signal output unit operable to:

output a control signal for instructing switching to the TV format video signal if the output instruction for the TV format video signal has been detected as a result of the detection performed by the detection unit; and output a control signal for instructing switching to the computer format video signal if the output instruction for the computer format video signal has been detected as a result of the detection performed by the detection unit; and a video signal switching unit operable to switch between the TV format video signal and the computer format video signal based on the control signal, and output outside of the computer apparatus one of the TV format video signal and the computer format video signal.

7. A video display method for a display performed by a display device based on a video signal outputted by a computer apparatus, the method comprising:

a play list control step of executing application software or replaying a video file, based on a play list held in a storage medium, the play list including descriptions of a video file name of a compressed video signal and a file name of the application software, as items to be replayed;

a video decoding step of decompressing the compressed video signal and outputting a TV format video signal based on the replay of the video file performed in said play list control step;

a video output step of outputting a computer format video signal based on the execution of the application software performed in said play list control step;

a detection step of detecting one of the following:

an output instruction for the computer format video signal at a time when the application software is executed in said play list control step; and an output instruction for the TV format video signal at a time when the replay of the compressed video signal is executed in said play list control step; and a control signal output step of:

outputting a control signal for instructing the display device to switch to the TV format video signal if the output instruction for the TV format video signal has been detected as a result of the detection in the detection step; and outputting a control signal for instructing the display device to switch to the computer format video signal if the output instruction for the computer format video signal has been detected as a result of the detection in the detection step.

8. A recording medium having a program stored thereon, the program causing a computer apparatus to execute a video display method for a display performed by a display device based on a video signal outputted by the computer apparatus, the video display method comprising:

a play list control step of executing application software or replaying a video file, based on a play list held in a storage medium, the play list including descriptions of a video file name of a compressed video signal and a file name of the application software, as items to be replayed;

a video decoding step of decompressing the compressed video signal and outputting a TV format video signal based on the replay of the video file performed in said play list control step;

a video output step of outputting a computer format video signal based on the execution of the application software performed in said play list control step;

a detection step of detecting one of the following:

an output instruction for the computer format video signal at a time when the application software is executed in said play list control step; and an output instruction for the TV format video signal at a time when the replay of the compressed video signal is executed in said play list control step; and a control signal output step of:

outputting a control signal for instructing the display device to switch to the TV format video signal if the output instruction for the TV format video signal has been detected as a result of the detection in the detection step; and outputting a control signal for instructing the display device to switch to the computer format video signal if the output instruction for the computer format video signal has been detected as a result of the detection in the detection step.

9. A storage medium on which the play list and the video file of the compressed video signal according to claim 1 are recorded.

* * * * *